US010407118B1

(12) United States Patent
Greenberg

(10) Patent No.: US 10,407,118 B1
(45) Date of Patent: Sep. 10, 2019

(54) SCOOTER APPARATUS AND METHODS OF USE

(71) Applicant: EonInnovations LLC, Lafayette, CA (US)

(72) Inventor: Dave Greenberg, Lafayette, CA (US)

(73) Assignee: EonInnovations LLC, Lafayette, CA (US)

( * ) Notice: Subject to any disclaimer, the term of this patent is extended or adjusted under 35 U.S.C. 154(b) by 0 days.

(21) Appl. No.: 16/168,565

(22) Filed: Oct. 23, 2018

(51) Int. Cl.
B62K 15/00 (2006.01)
B62J 1/08 (2006.01)
B62K 21/12 (2006.01)

(52) U.S. Cl.
CPC ............ B62K 15/006 (2013.01); B62J 1/08 (2013.01); B62K 21/125 (2013.01); B62J 2001/085 (2013.01); B62K 2202/00 (2013.01)

(58) Field of Classification Search
CPC ...... B62K 15/008; B62K 3/002; B62K 13/00; B62K 13/08; B62K 15/006; B62K 21/125; B62K 2202/00; B62J 1/08; B62J 2001/085; B60Y 2200/126
USPC ...................................................... 280/87.05
See application file for complete search history.

(56) References Cited

U.S. PATENT DOCUMENTS

| 1,658,068 | A | * | 2/1928 | White | B62K 3/002 |
| | | | | | 280/87.041 |
| 6,270,095 | B1 | | 8/2001 | Chang | |
| 6,301,749 | B1 | | 10/2001 | Chen | |
| 6,343,798 | B1 | * | 2/2002 | Chen | B62K 3/002 |
| | | | | | 280/5.26 |
| 6,428,021 | B1 | | 8/2002 | Tung | |
| 7,011,319 | B2 | | 3/2006 | Lu | |
| 7,077,229 | B2 | | 7/2006 | Lee | |
| 7,419,171 | B1 | * | 9/2008 | Ka Ming | B62K 3/002 |
| | | | | | 280/87.041 |
| 7,451,848 | B2 | | 11/2008 | Flowers et al. | |
| 7,654,356 | B2 | | 2/2010 | Wu | |
| 7,976,035 | B2 | | 7/2011 | Chan | |
| 8,381,858 | B2 | | 2/2013 | Wu et al. | |

(Continued)

FOREIGN PATENT DOCUMENTS

| CA | 2457380 | 8/2005 |
| CN | 102372061 | 3/2012 |

(Continued)

OTHER PUBLICATIONS

Indiegogo (2018) https://www.indiegogo.com/projects/eon-scooter-the-most-affordable-electric-scooter#/.

Primary Examiner — John D Walters
(74) Attorney, Agent, or Firm — Levine Bagade Han LLP

(57) ABSTRACT

A scooter apparatus and methods of use are disclosed where the scooter comprises a locking assembly generally having a neck latch cam having an elongate member and an angled member configured to rotate relative to a first pivot and a pivot throat latch positioned in proximity to the angled member and configured to rotate relative to a second pivot when actuated via the angled member. The locking assembly further includes a neck latch configured to rotate relative to a third pivot and a neck latch receiving member configured to lock a position of the neck latch when rotated about the third pivot upon actuation of the neck latch cam when rotated about the first pivot and the pivot throat latch when rotated about the second pivot.

10 Claims, 14 Drawing Sheets

(56) References Cited

U.S. PATENT DOCUMENTS

| | | |
|---|---|---|
| 8,413,753 B2 | 4/2013 | Wu et al. |
| 8,746,730 B2 | 6/2014 | Wu et al. |
| 8,776,932 B1 | 7/2014 | Bussinger et al. |
| D710,949 S | 8/2014 | Huang |
| 8,801,010 B2 | 8/2014 | Deb |
| 9,016,702 B2 * | 4/2015 | Huang ................ B62J 1/08 280/87.041 |
| D735,812 S | 8/2015 | Delgatty |
| D735,813 S | 8/2015 | Delgatty |
| 2004/0036249 A1 * | 2/2004 | McGuire ............ B62K 3/002 280/253 |
| 2009/0230648 A1 | 9/2009 | Chan |
| 2013/0167684 A1 | 7/2013 | Wang et al. |
| 2018/0186424 A1 * | 7/2018 | Sung ................ B62K 15/006 |

FOREIGN PATENT DOCUMENTS

| | | |
|---|---|---|
| CN | 203528697 | 4/2014 |
| CN | 104058049 | 9/2014 |
| CN | 204380215 | 6/2015 |
| DE | 202004002387 | 5/2004 |
| GB | 2423061 | 2/2007 |
| GB | 2494450 | 3/2013 |
| KR | 2001/20993 | 8/1998 |
| WO | WO 2008/154574 | 12/2008 |
| WO | WO 2014/012291 | 1/2014 |
| WO | WO 2014/114063 | 7/2014 |

* cited by examiner

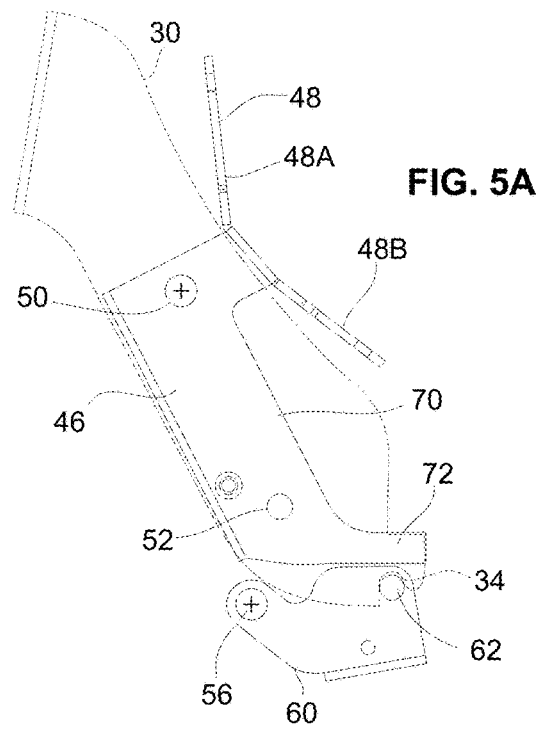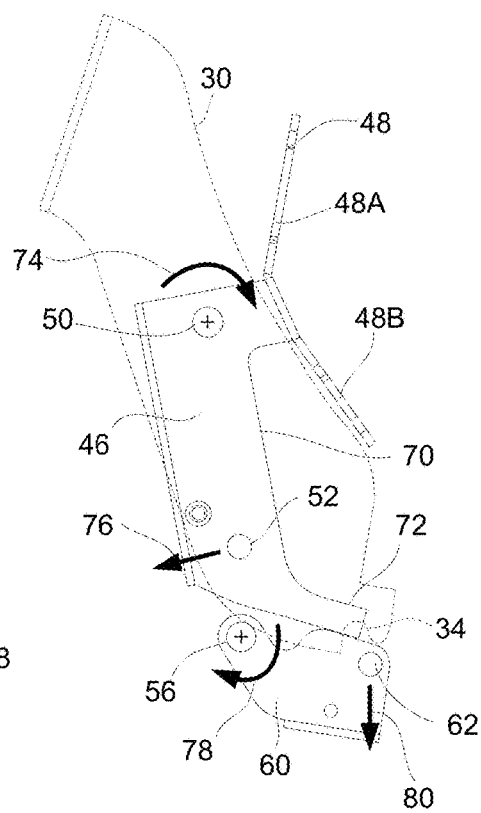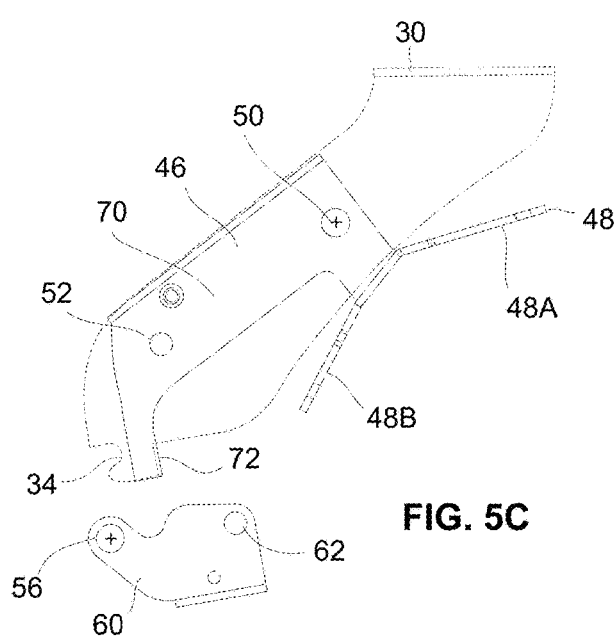

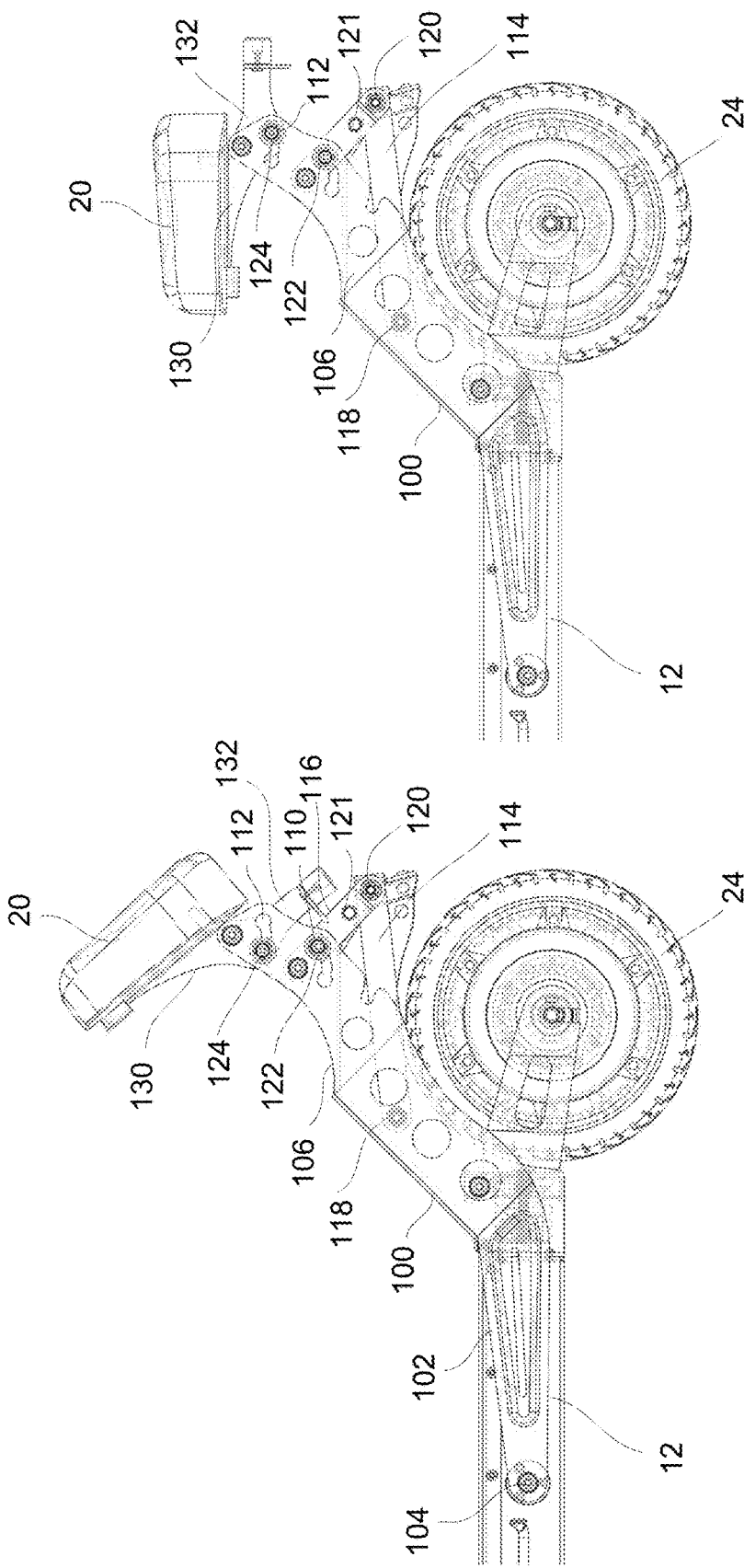

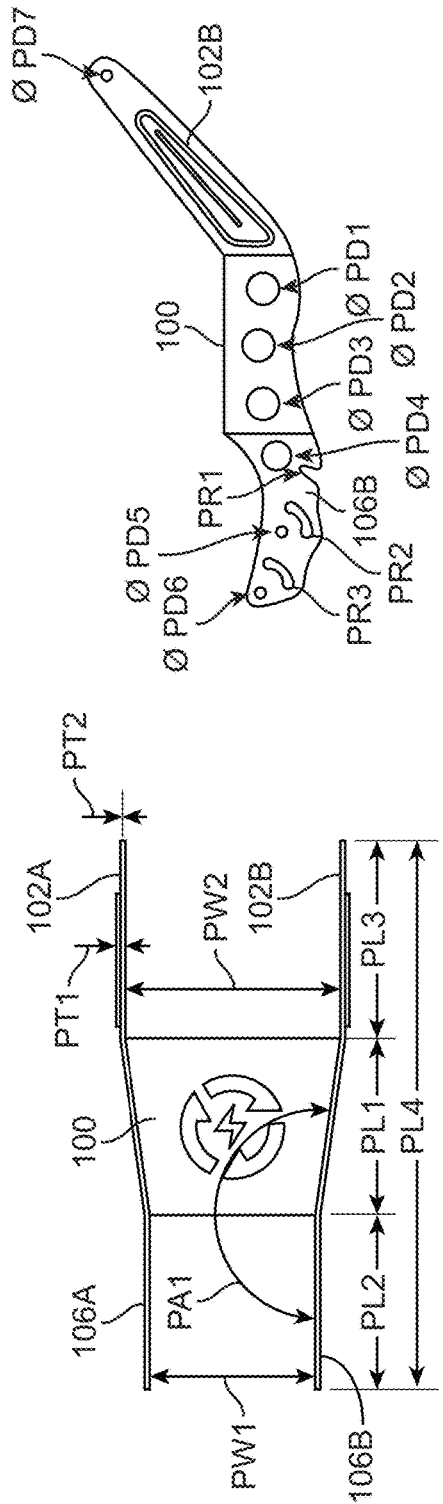
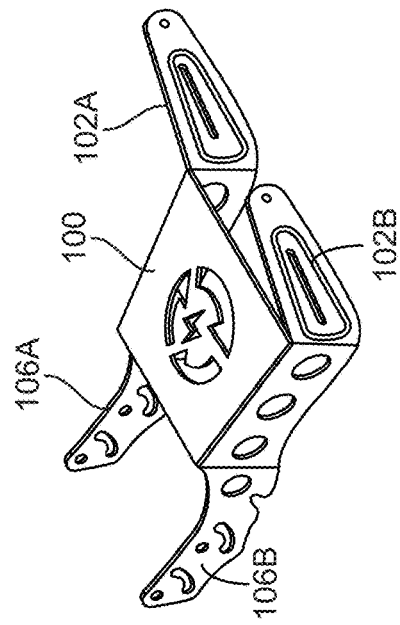
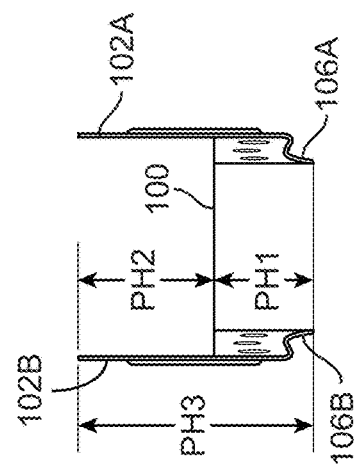
FIG. 9A
FIG. 9B
FIG. 9C
FIG. 9D

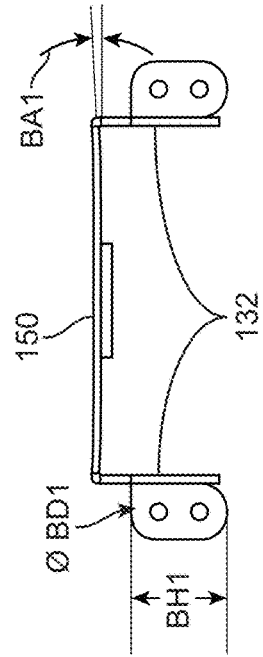
FIG. 10B
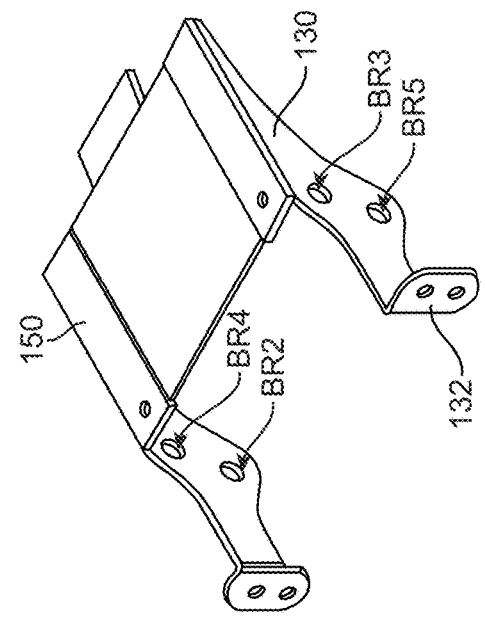
FIG. 10D
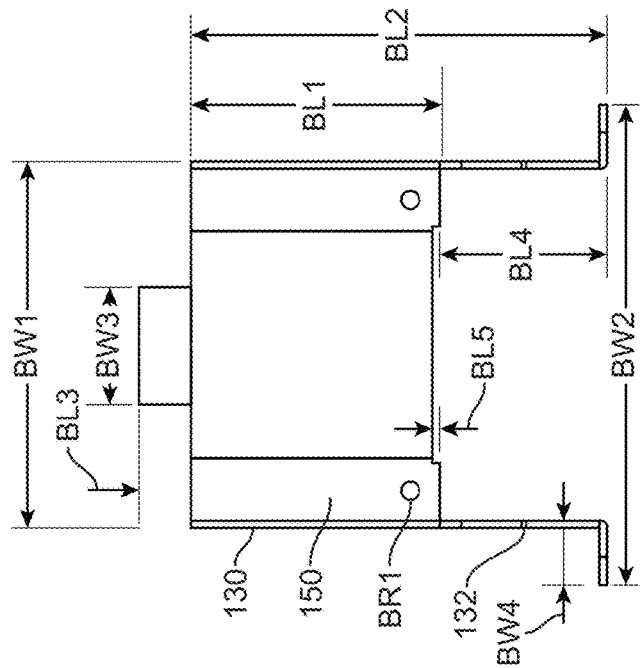
FIG. 10A
FIG. 10C

SCOOTER APPARATUS AND METHODS OF USE

FIELD OF THE INVENTION

The present invention relates to methods and apparatus for utilizing a collapsible scooter or personal vehicle. More particularly, the present invention relates to methods and apparatus for mechanisms which enable a scooter or personal vehicle to reconfigure from a collapsed or compact configuration into a deployed configuration having a secure and robust design.

BACKGROUND OF THE INVENTION

After riding a scooter, such as for commuting purposes, it is often desirable to collapse the scooter into a more compact configuration for storage or handling. Many conventional scooter designs often allow for the steering column to collapse down towards the deck or platform upon which the rider stands or sits. In such designs, the handle column is typically rotated about a single pivot point and engaged in place with a single locking mechanism.

Other conventional designs have utilized folding mechanisms which are located along the footboard or deck and could be prone to accidental activation. Moreover, these designs also take up space on the deck and may inconvenience users when the scooter is in use.

A similar design is often used to collapse or reconfigure a seat on the scooter, if used. Many designs may simply omit a reconfigurable seat and instead utilize a seat positioned upon a stationary post which is either maintained in position for storage or is removed entirely from the scooter. Furthermore, many scooter designs implementing a reconfigurable seat are cumbersome if the user chooses to stand upon the deck when using the scooter.

However, because of the desire to maintain a lightweight scooter as well as to minimize the volume of the scooter either when deployed for use or collapsed for storage, these design requirements often result in joints and locking mechanisms which are prone to failure.

Accordingly, there exists a need for methods and apparatus which allow for a scooter to collapse or reconfigure for storage or transportation while maintaining a robust and secure design, particularly for reconfiguring the steering column and/or seat.

SUMMARY OF THE INVENTION

A scooter assembly may generally comprise a deck or body chassis rotatably coupled to a reconfigurable neck assembly which is attached to a steering column. The steering column may be coupled to a front wheel at a distal end and to a handle assembly at a proximal end. A pivoting seat assembly may be attached to the deck and support a seat which may pivotably extend from the deck. One or both handles on the steering column may also be reconfigured from a retracted and compact configuration into a deployed configuration as well.

The neck assembly may be actuated to release the steering column which may be moved away from the deck and into its deployed configuration. The seat assembly may also be deployed from its compact configuration and locked into its deployed configuration as well. In this configuration, the user may elect to sit upon the seat and ride the scooter assembly in a seated position or the user may maintain or reconfigure the seat assembly in its retracted position and stand upon the deck in an upright position. The steering column may be extended via an adjustable column to extend the handle assembly to accommodate the user being in an upright position while standing upon the deck.

While the mechanisms and methods of use described herein may be with reference to a scooter, they are not limited to use with scooters but may be implemented on any number of other vehicles used for transportation, recreation, etc. Moreover, the scooter assembly may be powered via one or more motors (e.g., driven or actuated via an electric or internal combustion motor) or manually pushed or operated by the user without the aid of any motors.

In order to retract and/or deploy the steering column relative to the deck, the neck assembly enables the rotation and securement of the two relative to one another. The neck latch may generally comprise a structural housing which is attached to the steering column and extend at an angle to form a curved structure which defines a neck latch receiving channel received within a neck latch receiving member which is attached to a distal end of the deck. The neck latch may be rotatingly coupled to the neck latch receiving member via a neck latch pivot which allows for the rotation of the neck latch relative to the neck latch receiving member. The position of the neck latch may be secured and maintained in place by a releasable neck latch locking pin which extends from a neck latch cam rotatingly housed within the neck latch and selectively rotated by actuation of actuation lever attached to the neck latch cam and extending from the neck latch through a neck latch opening for manipulation by the user.

Depressing the actuation lever initiates a dual-step locking or unlocking process to lock or unlock two separate locking mechanisms. Depending on the direction the actuation lever is depressed, the neck latch cam may rotate within the neck latch about a neck latch cam pivot to move a neck latch locking pin extending from a surface of the neck latch cam. The neck latch locking pin may extend through a neck latch opening channel to be securely retained within a deployment locking channel defined at a first location along the neck latch receiving member. The position of the neck latch cam and its locking pin may remain in position within the deployment locking channel by a neck latch biasing member such as a spring element which is coupled to the neck latch cam to bias it in a locking position.

The distal portion of the neck latch cam may be cooperatively in contact with a curved portion of a pivot throat latch which is rotatingly housed within the neck latch receiving member in proximity to the neck latch cam. The pivot throat latch may be rotatingly attached via a pivot throat latch pivot and may also have a pivot throat latch locking pin extending from its surface and slidingly retained within a receiving member opening defined along the neck latch receiving member.

A position of the pivot throat latch may be maintained in a locking position via a pivot throat latch biasing member such as a spring element which urges the pivot throat latch into a biased position forcing the pivot throat latch locking pin in an upward position relative to the deck.

Depressing the actuation lever initiates a dual-step locking or unlocking process to lock or unlock two separate locking mechanisms. The first step of an unlocking process involves a lower portion of the actuation lever being depressed where the neck latch cam may rotate about neck latch cam pivot against the force of the biasing member to move the neck latch locking pin from its first locked position within the deployment lock channel and into its unlocked position within the neck latch opening channel. The movement of the neck latch locking pin partially unlocks the neck latch from its locked position.

The second step of the unlocking process further involves the full unlocking of the neck latch. As the neck latch cam is further rotated, a distal end of the cam may engage against a curved surface of the pivot throat latch to then urge the throat latch to rotate about a pivot against the force of the biasing member so that the pivot throat latch locking pin is moved within the receiving member opening from its locking position to an unlocked position. This movement of the locking pin enables the neck latch receiving channel defined at a distal end of the neck latch in proximity to the neck latch pivot to be released so that neck latch is free to be rotated about the neck latch pivot relative to the neck latch receiving member.

With both neck latch locking pin and pivot throat latch locking pin moved into their unlocked positions, the neck latch may be rotated to move the steering column proximally towards the deck while the pin slides along the curved surface of the neck latch receiving member. The steering column may thus be fully retracted when the neck latch locking pin is moved into engagement with the retracted locking channel. Because of the biasing member urging the neck latch cam, the locking pin may automatically engage the retracted locking channel to automatically lock the steering column. To unlock the steering column from its retracted position to its deployed position, the actuation lever may be actuated and the process reversed.

Because the steering column and neck latch utilizes a first locking pin to lock the neck latch to the neck latch receiving member and a second locking pin to lock not only the neck latch but also the first locking pin, the locking mechanism provides a robust securement which also prevents or inhibits the accidental release of the steering column during use its deployed configuration.

Another feature includes how the neck latch locking mechanism may naturally hold or maintain the neck latch locking pin in its locked position. As the user sits or stands upon the scooter assembly during use, the weight of the user as well as the scooter weight itself may impart a force concentrated upon the neck latch pivot and the deployment locking channel against the locking pin. Because the deployment locking channel is configured at an angle which rises at a positive slope along a proximal direction, the locking pin may be forced in a proximal direction further against the deployment locking channel. This locking configuration may further prevent or inhibit the accidental release of the steering column during use its deployed configuration.

Turning now to the seat assembly, the seat when fully deployed for use may be positioned to form an angle relative to the deck such that the front portion of the seat extends upward relative to the user when seated upon the seat. The seat may be angled as such relative to the deck to prevent the user from sliding off of the seat when stopping the scooter. The angle may be adjusted to fall within a range suitable for rider comfort. The seat may be pivotably coupled to a seat pivot assembly which is generally comprised of a seat pivot arm having a first lever arm extending at an angle from the seat pivot arm which may be pivotably coupled to the deck via a pivot and a second lever arm extending from the seat pivot arm to rotatably couple to the seat. A first end of the lower arm member may be pivotably coupled via pivot to the chassis while a second end of the lower arm member may be pivotably coupled to a first end of an upper arm member via a pivot and a second end of the upper arm member may be coupled to the second lever arm via a pivoted connection as well.

When the lower and upper arm members are fully extended relative to one another, a locking pin extending from the upper arm member may engage with a receiving channel defined along the second lever arm such that further rotation of the arm members is inhibited. A position of the extended arm members may be maintained and locked into place via a retractable stop which is slidingly positioned within a curved receiving channel defined along second lever arm.

When the seat pivot assembly is ready to be retracted into its compact configuration, the retractable stop may be disengaged from its locked position within the curved receiving channel to allow the lower arm members to be pulled away from the second lever arm to disengage the locking pin from the receiving channel. As the lower and upper arm members rotate about their pivoted connections, the seat pivot arm may rotate about a pivot to begin the retraction of the seat pivot assembly. When the pivot has been fully retracted, the seat pivot may be retracted against the chassis and the first lever arm may lie parallel with the deck. The seat may then be retracted as well by disengaging a retractable stop to allow the seat pivot bracket, upon which the seat may be mounted, and seat extension members to reposition within the receiving channel so that the seat is collapsed into a low profile as well.

With the seat pivot bracket and seat deployed and the upper arm members extended, the ends of the upper members may be seen rotatingly coupled to a crossbar which extends into a yoke member having two parallel extension arms which is also rotatingly coupled to the second lever arm at respective pivots. The retractable stop may extend from a tubular member which extends between the extension arms such that when the stop is pulled into the tubular member, the stop may be situated within an enlarged portion of the curved receiving channel such that movement between the crossbar and second lever arm is prevented and effectively locks the movement of the seat assembly. The stop may be pulled away from the tubular member and the receiving channel thereby allowing movement between the two for retracting or adjusting the seat assembly.

The seat is also adjustable relative to the second lever arm as the seat may be attached to a seat pivot bracket which extends to two arm members which have a tubular member also extending therebetween. The retractable stop may be retractably coupled to the tubular member and may also extend through the receiving channel to enable the pivoting and locking of the seat bracket. As with the second lever arm, when the stop is situated within an enlarged portion of the receiving channel, movement between the seat bracket and second lever arm is prevented and effectively locks the movement of the seat bracket. Retracting the stop away from the tubular member allows for movement between the seat bracket and second lever arm.

The deck forms a chassis defining an enclosure which may hold a number of components for the scooter, e.g., battery, electronics, etc. The enclosure may have a length and may define a lip or edge around a periphery of the enclosure for attaching a platform upon which the user may stand or place their feet.

A distal portion of the enclosure may have the neck latch receiving member mounted and a proximal portion of the enclosure may have a fender attached which extends proximally from the enclosure to cover the rear wheel such that the fender extends above the enclosure at a height.

In one variation, the scooter comprises a locking assembly generally having a neck latch cam having an elongate member and an angled member configured to rotate relative to a first pivot and a pivot throat latch positioned in proximity to the angled member and configured to rotate relative to a second pivot when actuated via the angled member. The locking assembly further includes a neck latch configured to rotate relative to a third pivot and a neck latch receiving member configured to lock a position of the neck latch when rotated about the third pivot upon actuation of the neck latch cam when rotated about the first pivot and the pivot throat latch when rotated about the second pivot.

In another variation, the scooter assembly generally comprises a deck sized for a user to sit or stand thereupon, a reconfigurable neck assembly attached to a distal portion of the deck and a steering column attached to the neck assembly. The scooter assembly may further include a reconfigurable pivoting seat assembly attached to a proximal portion of the deck, wherein the neck assembly and pivoting seat assembly are reconfigurable between a deployed position and a retracted position. Additionally, the neck assembly may be configured to prevent or inhibit a release of the neck assembly from the deployed position when the user sits or stands upon the deck.

In one variation for a method of selectively releasing a locking assembly, the method may generally comprise actuating a neck latch cam having an elongate member and an angled member to rotate about a first pivot, wherein rotation about the first pivot releases a neck latch locking pin from a locking channel and imparting a force upon a pivot throat latch via the angled member such that the pivot throat latch rotates about a second pivot. The method may also include releasing a pivot throat latch locking pin from a neck latch receiving channel such that a neck latch rotates about a third pivot to release the locking assembly.

BRIEF DESCRIPTION OF THE DRAWINGS

FIGS. 5A to 5C show detail side views of the neck latch cam and pivot throat latch mechanisms corresponding to the reconfiguration shown in FIGS. 4A to 4C.

FIGS. 8A to 8D show detail side views of the seat pivot arm transitioning from a deployed and locked configuration to a retracted and locked configuration for transportation or storage.

FIGS. 9A to 9D show various views of one variation of the seat pivot arm mechanism.

FIGS. 10A to 10D show various views of one variation of the seat pivot bracket mechanism.

DETAILED DESCRIPTION OF THE INVENTION

Figure 1A:
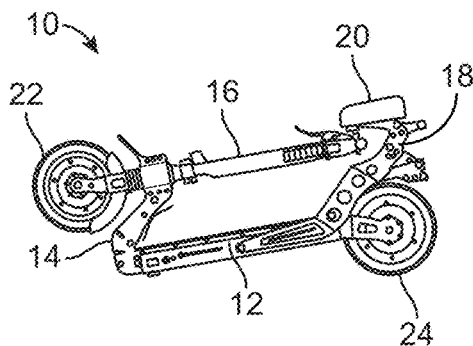
FIGS. 1A to 1D show side views of one variation of the scooter in various stages when reconfiguring from a compact configuration to a deployed configuration.

One variation of the scooter design is shown in the side views of FIG. 1A to 1D which illustrate a scooter assembly 10 having a deck or body chassis 12 rotatably coupled to a reconfigurable neck assembly 14 which is attached to a steering column 16. The steering column 16 may be coupled to a front wheel 22 at a distal end and to a handle assembly at a proximal end. A pivoting seat assembly 18 may be attached to the deck 12 and support a seat 20 which may pivotably extend from the deck 12. In the collapsed or compact configuration shown in FIG. 1A, the steering column 16 and neck assembly 14 are retracted and the pivoting seat assembly 18 are also retracted and positioned above the rear wheel 24. One or both handles on the steering column 16 may also be reconfigured from a retracted and compact configuration into a deployed configuration as well.

Figure 1B:
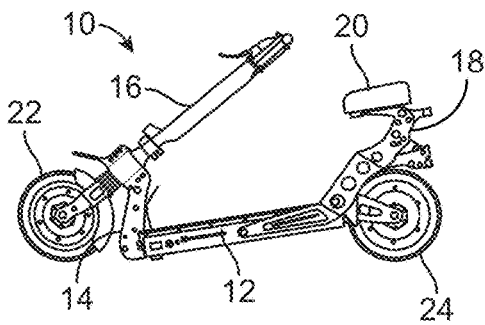
Figure 1C:
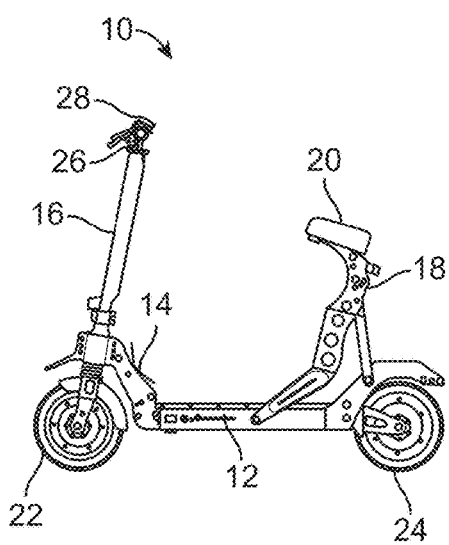
Figure 1D:
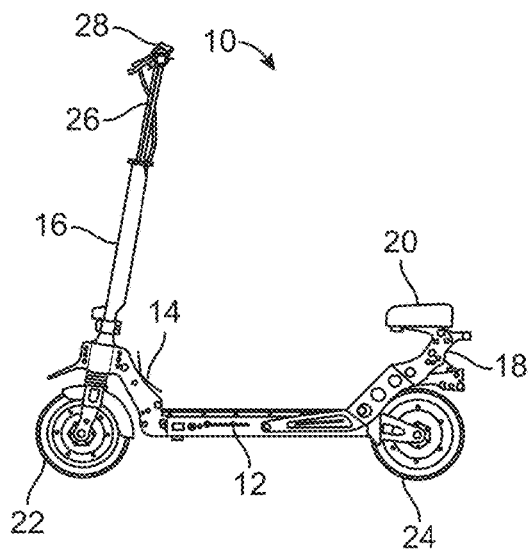
Figure 1E:
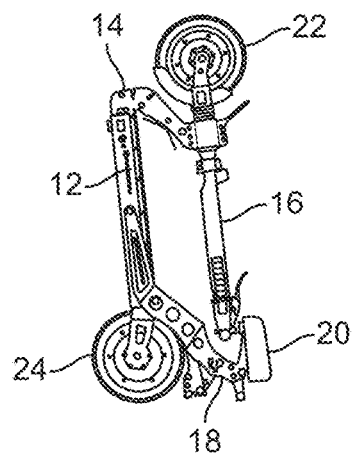
FIG. 1E shows a side view of the scooter in a compact configuration for transport.

The neck assembly 14 may be actuated (as described in detail herein) to release the steering column 16 which may be moved away from the deck 12, as shown in FIG. 1B, and into its deployed configuration, as shown in FIG. 1C. The seat assembly 18 may also be deployed from its compact configuration and locked into its deployed configuration as well. In this configuration, the user may elect to sit upon the seat 20 and ride the scooter assembly 10 in a seated position or the user may maintain or reconfigure the seat assembly 18 in its retracted position, as shown in FIG. 1D, and stand upon the deck 12 in an upright position. The steering column 16 may be extended via an adjustable column 26 to extend the handle assembly 28 to accommodate the user being in an upright position while standing upon the deck 12. FIG. 1E shows the scooter assembly 10 in its compact configuration and lifted up to rest upon the ground, platform, or surface so that the scooter assembly 10 is supported by the pivoting seat assembly 18 and rear wheel 24. The scooter assembly 10 may be readily stored in this configuration.

While the mechanisms and methods of use described herein may be with reference to a scooter, they are not limited to use with scooters but may be implemented on any number of other vehicles used for transportation, recreation, etc. Moreover, the scooter assembly 10 may be powered via one or more motors (e.g., driven or actuated via an electric or internal combustion motor) or manually pushed or operated by the user without the aid of any motors.

Figure 2A:
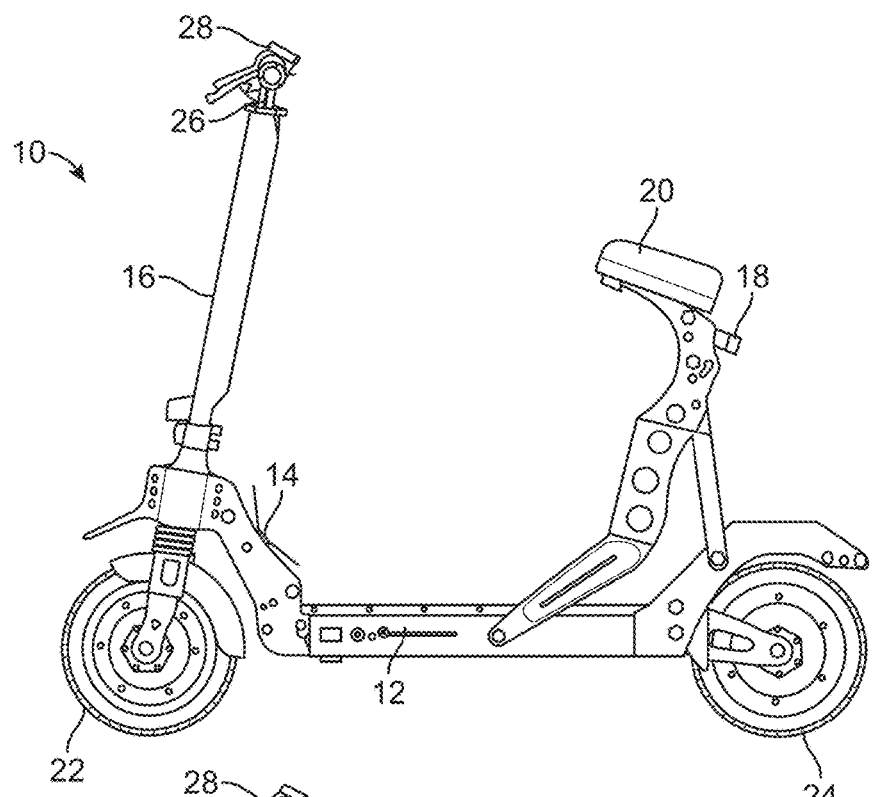
FIGS. 2A and 2B show side views of one variation of the scooter configured for use with the pivoting seat retracted and with the seat deployed for use.
Figure 2B:
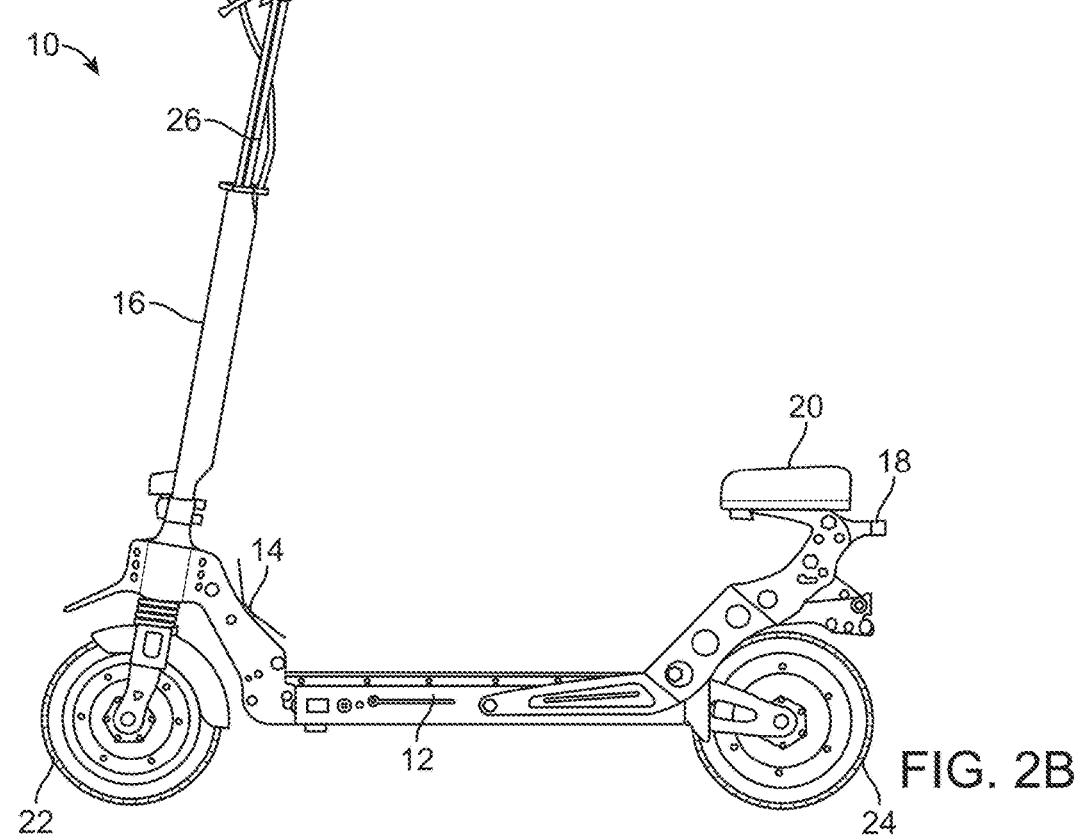

FIGS. 2A and 2B show close-up side views of the scooter assembly 10 in two different configurations similar to that shown in FIGS. 1C and 1D, respectively. In the deployed configuration shown in FIG. 2A, the steering column 16 and neck assembly 14 are illustrated in their deployed and locked configuration and the seat assembly 18 is also illustrated in its deployed and locked configuration. The user may sit upon seat 20 and steer the scooter via the handle assembly 28. Alternatively, the user may stand upon the deck 12 of the scooter with the seat 20 deployed or retracted, as shown in FIG. 2B, with the handle assembly 28 and adjustable column 26 extended from the steering column 16.

Figure 3A:
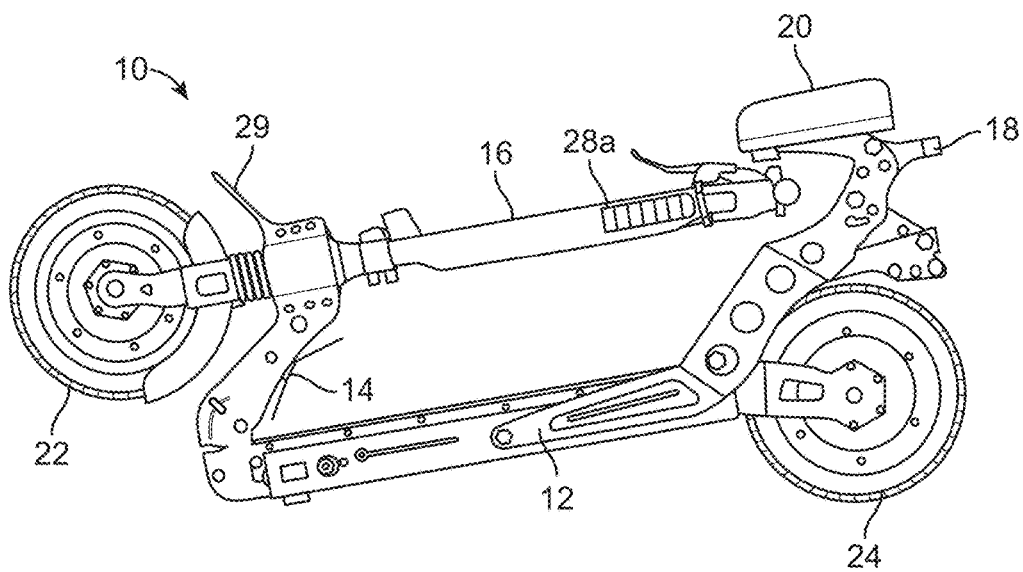
FIGS. 3A and 3B show side and perspective views of one variation of the scooter in its compact configuration for transportation or storage with the steering column and seat retracted.
Figure 3B:
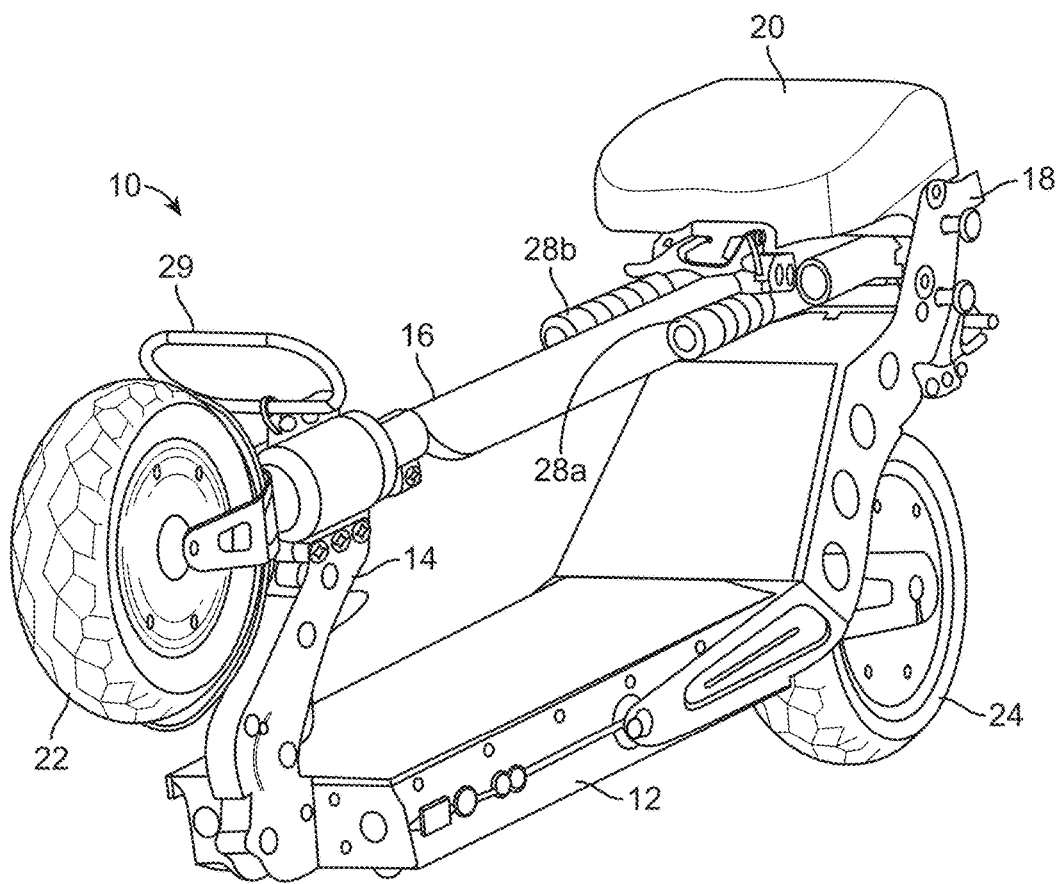

FIGS. 3A and 3B show side and perspective views of the scooter assembly 10 to illustrate how the scooter may be configured into its collapsed or retracted configuration for transportation or storage. As illustrated, the neck assembly 14 is shown in its retracted and locked position such that the steering column 16 is drawn towards the deck 12. The seat assembly 18 is also shown collapsed or retracted such that the seat 20 may be positioned over at least a portion of the steering column 16 and/or handle assembly 28A, 28B. An additional handle 29 may be provided proximate to the front wheel 22 and extending, e.g., at an angle relative to the steering column 16 to provide the user a structural member for grasping or holding to lift the scooter 10 in its collapsed configuration, e.g., to pull the scooter via the rear wheel 24 or to carry the scooter 10.

Neck Assembly

Figure 4A:
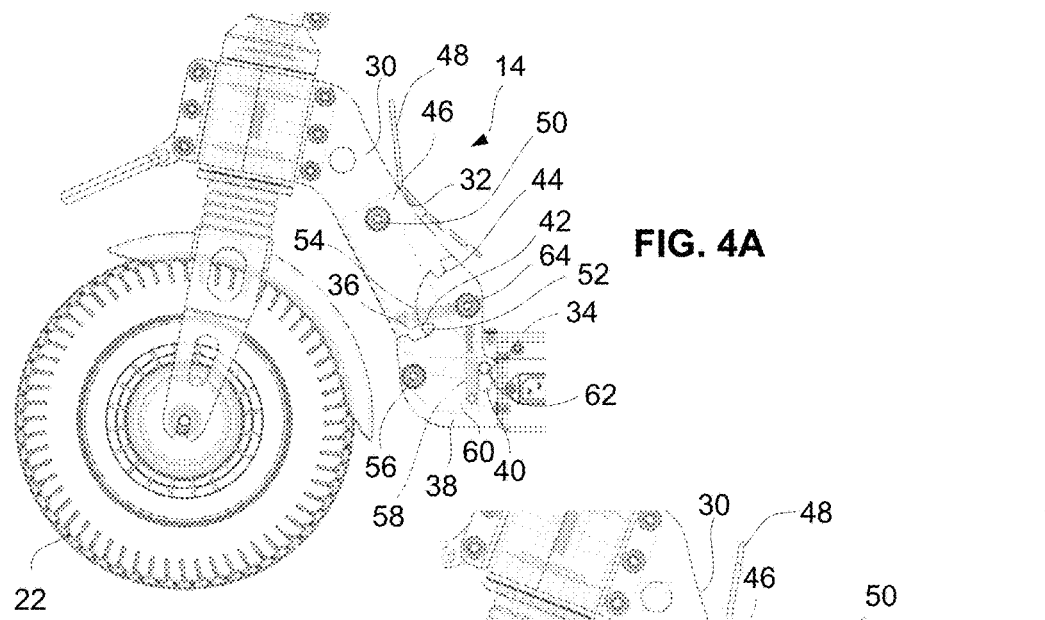
FIGS. 4A to 4C show detail side views of the locking neck mechanism transitioning from a deployed and locked configuration to a retracted and locked configuration for transportation or storage.

In order to retract and/or deploy the steering column 16 relative to the deck 12, the neck assembly 14 enables the rotation and securement of the two relative to one another. FIG. 4A shows a detail side view of the neck assembly 14 and the components associated with its operation. The neck latch 30 may generally comprise a structural housing which is attached to the steering column 16 and extend at an angle to form a curved structure which defines a neck latch receiving channel 34 (described in further detail herein) received within a neck latch receiving member 38 which is attached to a distal end of the deck 12. The neck latch 30 may be rotatingly coupled to the neck latch receiving member 38 via a neck latch pivot 64 which allows for the rotation of the neck latch 30 relative to the neck latch receiving member 38. The position of the neck latch 30 may be secured and maintained in place by a releasable neck latch locking pin 52 which extends from a neck latch cam 46 rotatingly housed within the neck latch 30 and selectively rotated by actuation of actuation lever 48 attached to the neck latch cam 46 and extending from the neck latch 30 through a neck latch opening 32 for manipulation by the user.

Depressing the actuation lever 48 initiates a dual-step locking or unlocking process to lock or unlock two separate locking mechanisms. Depending on the direction the actuation lever 48 is depressed, the neck latch cam 46 may rotate within the neck latch 30 about a neck latch cam pivot 50 to move a neck latch locking pin 52 extending from a surface of the neck latch cam 46. The neck latch locking pin 52 may extend through a neck latch opening channel 36 to be securely retained within a deployment locking channel 42 defined at a first location along the neck latch receiving member 38, as shown in FIG. 4A. The position of the neck latch cam 36 and its locking pin 52 may remain in position within the deployment locking channel 42 by a neck latch biasing member 54 such as a spring element which is coupled to the neck latch cam 36 to bias it in a locking position.

The distal portion of the neck latch cam 46 may be cooperatively in contact with a curved portion of a pivot throat latch 60 which is rotatingly housed within the neck latch receiving member 38 in proximity to the neck latch cam 46. The pivot throat latch 60 may be rotatingly attached via a pivot throat latch pivot 56 and may also have a pivot throat latch locking pin 62 extending from its surface and slidingly retained within a receiving member opening 40 defined along the neck latch receiving member 38, as shown.

A position of the pivot throat latch 60 may be maintained in a locking position via a pivot throat latch biasing member 58 such as a spring element which urges the pivot throat latch 60 into a biased position forcing the pivot throat latch locking pin 62 in an upward position relative to the deck 12.

As previously mentioned, depressing the actuation lever 48 initiates a dual-step locking or unlocking process to lock or unlock two separate locking mechanisms. The first step of an unlocking process is shown in the detail side view of FIG. 4B where once a lower portion of the actuation lever 48 is depressed, the neck latch cam 46 may rotate about neck latch cam pivot 50 against the force of the biasing member 54 to move the neck latch locking pin 52 from its first locked position within the deployment lock channel 42 and into its unlocked position within the neck latch opening channel 36. The movement of the neck latch locking pin 52 partially unlocks the neck latch 30 from its locked position.

The second step of the unlocking process further involves the full unlocking of the neck latch 30. As the neck latch cam 46 is further rotated, a distal end of the cam 46 may engage against a curved surface of the pivot throat latch 60 to then urge the throat latch 60 to rotate about pivot 56 against the force of the biasing member 58 so that the pivot throat latch locking pin 62 is moved within receiving member opening 40 from its locking position to an unlocked position. This movement of locking pin 62 enables the neck latch receiving channel 34 defined at a distal end of the neck latch 30 in proximity to the neck latch pivot 64 to be released so that neck latch 30 is free to be rotated about neck latch pivot 64 relative to the neck latch receiving member 38.

With both neck latch locking pin 52 and pivot throat latch locking pin 62 moved into their unlocked positions, neck latch 30 may be rotated to move the steering column 16 proximally towards the deck 12 while the pin 52 slides along the curved surface of the neck latch receiving member 38. The steering column 16 may thus be full retracted when the neck latch locking pin 52 is moved into engagement with retracted locking channel 44, as shown in FIG. 4C. Because of the biasing member 54 urging the neck latch cam 46, the locking pin 52 may automatically engage the retracted locking channel 44 to automatically lock the steering column 16. To unlock the steering column 16 from its retracted position to its deployed position, actuation lever 48 may be actuated and the process reversed.

Because the steering column 16 and neck latch 30 utilizes a first locking pin 62 to lock the neck latch 30 to the neck latch receiving member 38 and a second locking pin 52 to lock not only the neck latch 30 but also the first locking pin 62, the locking mechanism provides a robust securement which also prevents or inhibits the accidental release of the steering column 16 during use its deployed configuration.

The mechanisms, as described, enable the neck assembly 14 to be unlocked with a single touch while actuating the dual-step locking or unlocking process. This design not only allows for the neck assembly 14 to be eliminate extra steps in actuating the mechanism, e.g., an extra step for a cam locking lever release or release of a pin, but also enables the design to be relatively lightweight as well. With the elimination of extra steps and parts, the neck assembly 14 is less likely to wear over time and is able to maintain a relatively high precision of the alignment of the parts.

Figure 4B:
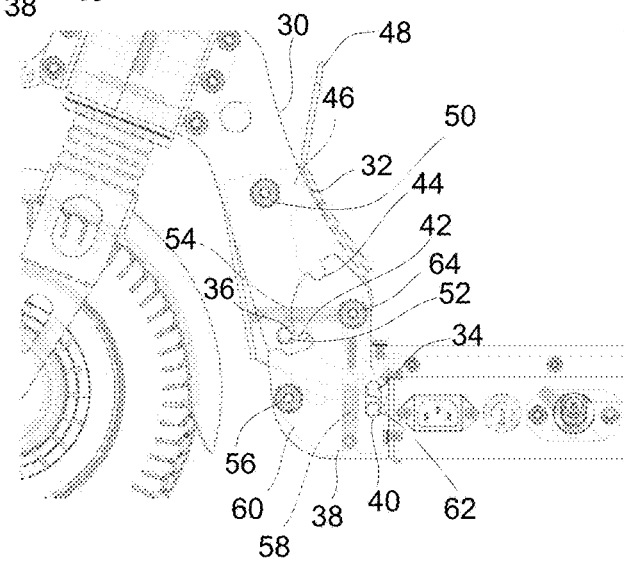
Figure 4C:
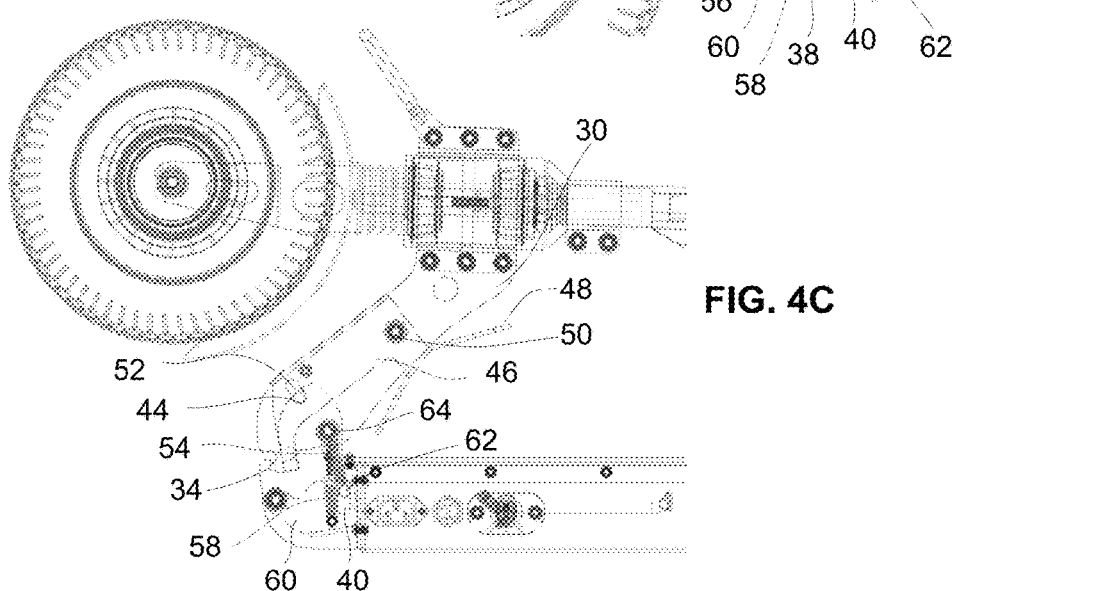
Figure 4D:
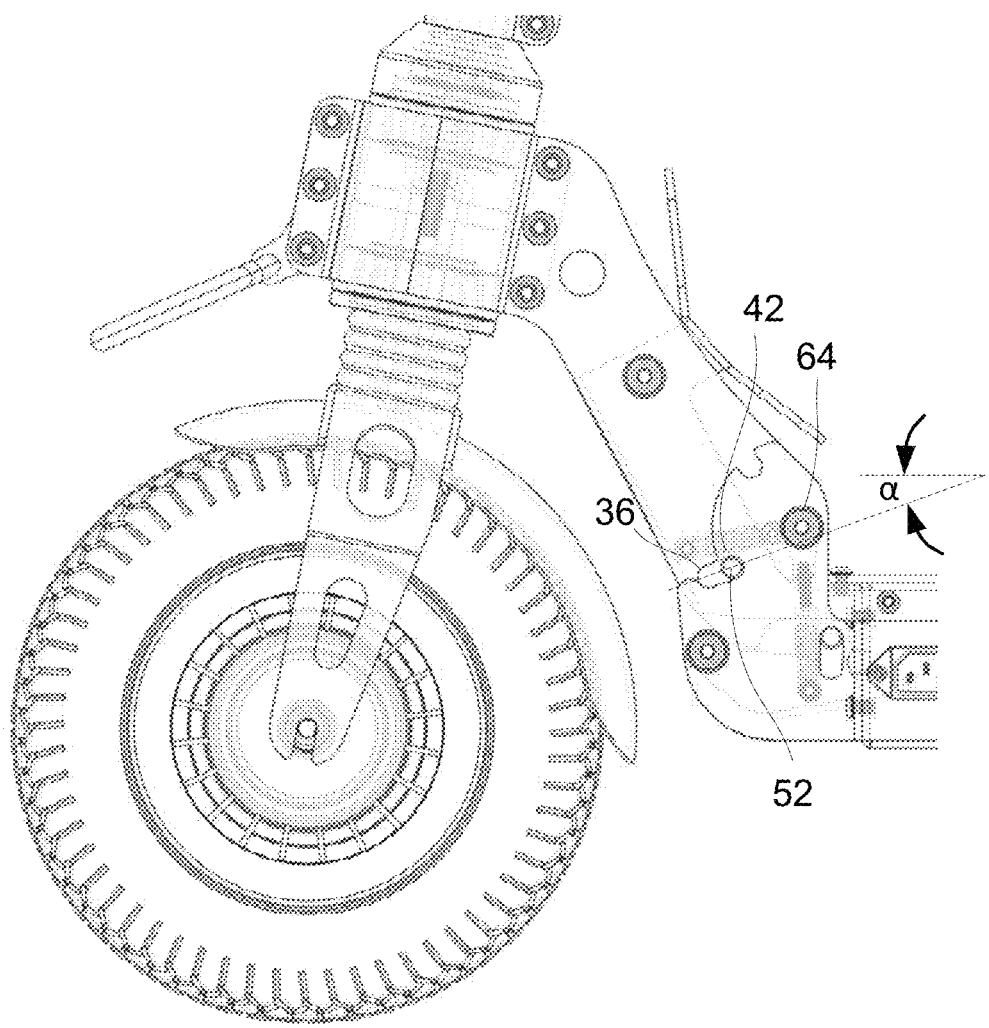
FIG. 4D shows a detail side view of the locking neck mechanism illustrating how the neck latch locking pin may be held in its locked position during use of the scooter.

Another feature is shown in the detail side view of FIG. 4D which illustrates how the neck latch locking mechanism may naturally hold or maintain the neck latch locking pin 52 in its locked position. As the user sits or stands upon the scooter assembly 10 during use, the weight of the user as well as the scooter weight itself may impart a force concentrated upon the neck latch pivot 64 and the deployment locking channel 42 against the locking pin 52. Because the deployment locking channel 42 is configured at an angle α which rises at a positive slope along a proximal direction, the locking pin 52 may be forced in a proximal direction further against the deployment locking channel 42. This locking configuration may further prevent or inhibit the accidental release of the steering column 16 during use its deployed configuration.

FIGS. 5A to 5C show detail side views of the neck latch cam 46 and pivot throat latch 60 mechanisms corresponding to the reconfiguration shown in FIGS. 4A to 4C to further illustrate how the neck latch receiving channel 34 is locked and/or unlocked. With the neck latch receiving channel 34 engaged by pivot throat latch locking pin 62 in the locked configuration, the pulling of first actuation lever 48A or pushing of second actuation lever 48B forces the angled portion 72 extending from the elongate portion 70 of the neck latch cam 46 to contact the engagement surface of the pivot throat latch 60, as shown in FIG. 5B.

As the neck latch cam 46 rotates about neck latch cam pivot 50, as indicated by rotational arrow 74, the neck latch locking pin 52 may also move into its unlocked position, as indicated by directional arrow 76. As the angled portion 72 further engages the pivot throat latch 60, the pivot throat latch locking pin 62 is forced to move into its unlocked position, as indicated by directional arrow 80 as the pivot throat latch 60 rotates about pivot throat latch pivot 56, as indicated by rotational arrow 78. With the pivot throat latch locking pin 62 moved, the neck latch receiving channel 34 is thus free to move allowing for the rotation of the neck latch 30 about the neck latch pivot 64, as previously described. As the neck latch 30 is further rotated, the neck latch locking pin 52 may become engaged with the retracted locking channel 44, as previously described, to maintain the neck latch 30 and steering column 16 in its compact configuration, as shown in FIG. 5C.

Figure 6A:
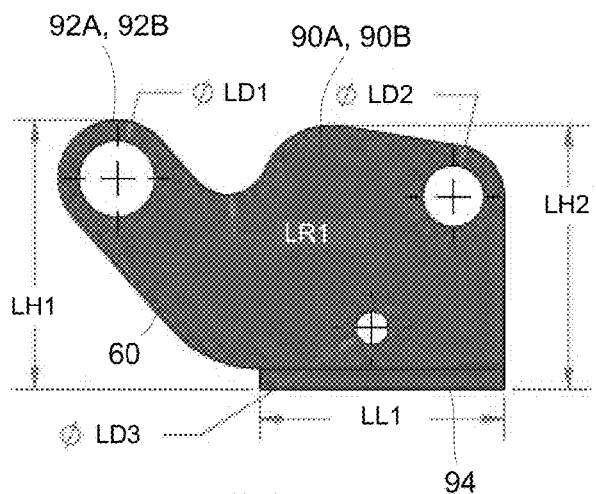
FIGS. 6A to 6E show various views of one variation of the pivot throat latch mechanism.
Figure 6B:
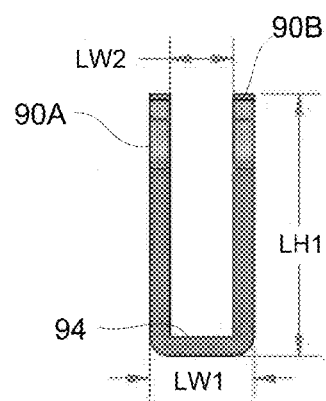
Figure 6C:
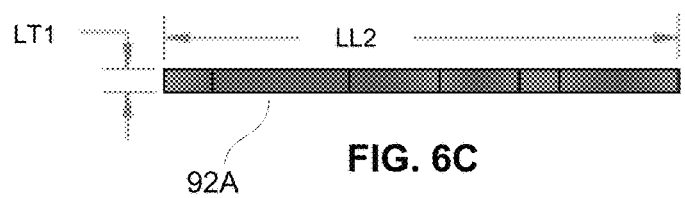
Figure 6D:
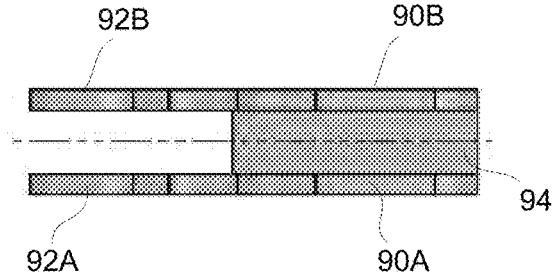
Figure 6E:
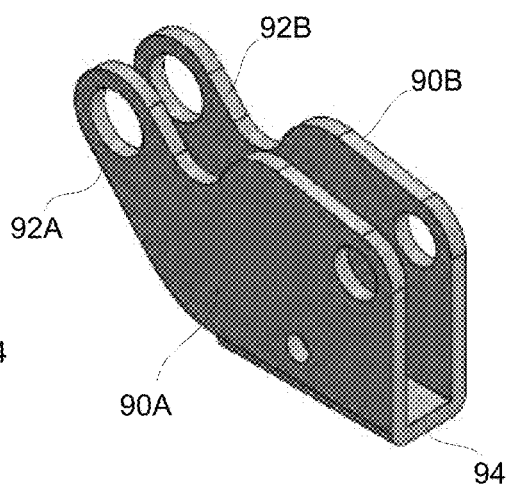

FIGS. 6A to 6E show various views of the pivot throat latch 60. FIGS. 6A and 6B show side and end views illustrating how the pivot throat latch 60 may have a base member 94 having a width LW1, e.g., 0.644 in., and length LL1, e.g., 1.500 in., with a first member 90A and a second member 90B extending in parallel transversely relative to the base 94 to a height LH2, e.g., 1.625 in., while separated by a width LW2, e.g., 0.394 in. The first and second members 90A, 90B may have a curved peripheral edge which defines a radius LR1, e.g., 0.250 in., curving inwardly relative to the members 90A, 90B and which further defines a first extension 92A and a second extension 92B each having a height LH1, e.g., 1.657 in., and which extends to form an overall length of the pivot throat latch 60 of LL2, e.g., 2.737 in., as shown in the top view of FIG. 6C. The first and second extensions 92A, 92B may each define an opening having a diameter LD1, e.g., 0.470 in., about which the pivot throat latch 60 may rotate. A second opening having a diameter LD2, e.g., 0.375 in., may be defined along a proximate edge of the first and second members 90A, 90B through which the pivot throat latch locking pin 62 may be secured as well as a third opening having a diameter LD3, e.g., 0.203 in., through which the pivot throat latch biasing member 58 may be secured. FIGS. 6D and 6E show respective top and perspective views of the pivot throat latch 60.

Figures 7A, 7B, 7C:
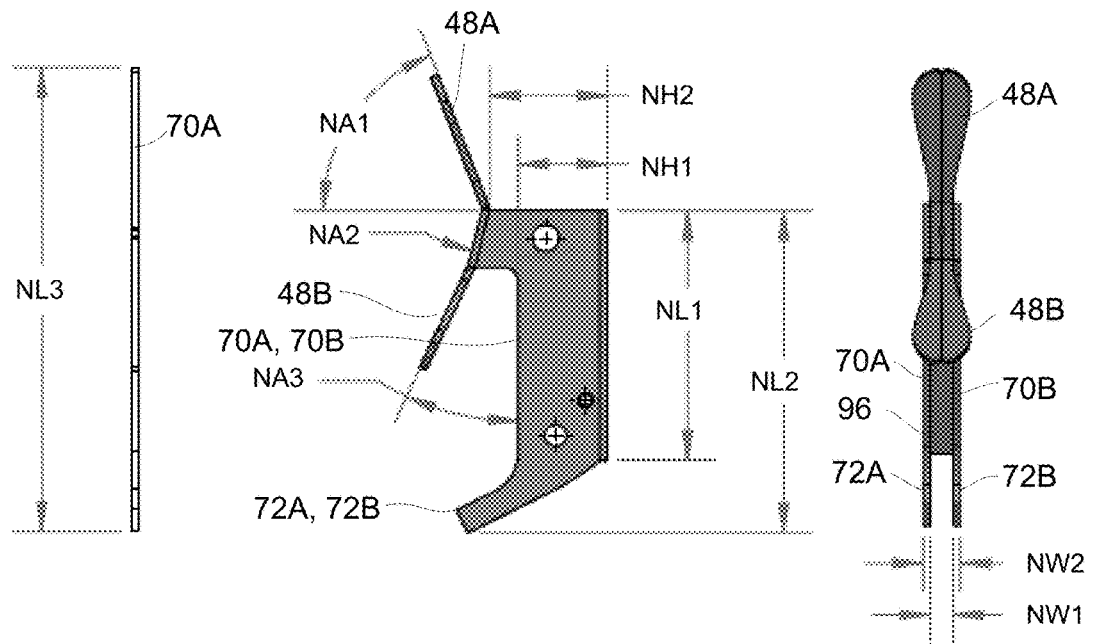
FIGS. 7A to 7D show various views of one variation of the neck latch cam mechanism.
Figure 7D:
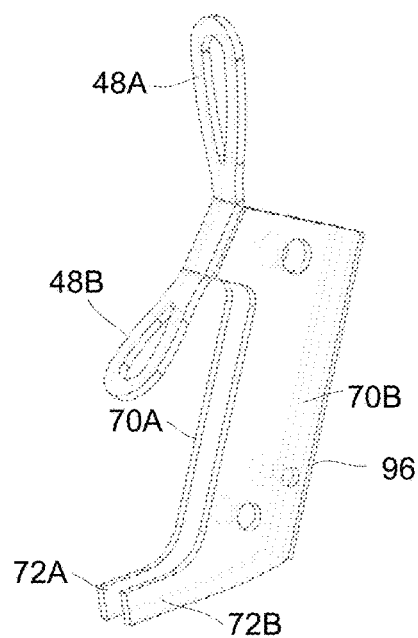

FIGS. 7A to 7D show various views of the neck latch cam 46 which may be formed of a first elongate member 70A and a second elongate member 70B which extends in parallel along a base member 96 having a length NL1, e.g., 4.423 in., and a height of NH1, e.g., 1.555 in. The first and second elongate members 70A, 70B may be separated from one another by a width NW1, e.g., 0.394 in., and have an overall width NW2, e.g., 0.644 in. Each of the elongate members may extend to form a respective first angled member 72A and second angled member 72B so that an overall length of NL2, e.g., 5.703 in., is formed. The proximal end of the elongate members 70A, 70B may extend transversely from the base 96 and may form the actuation lever at an angle NA2, e.g., 14°, relative to the base 96 and which may be formed into a first lever 48A and second lever 48B which extend away from one another at an angle. The first lever 48A may form an angle NA1, e.g., 69°, relative to a normal axis from the base 96 while the second lever 48B may form an angle NA3, e.g., 25°, relative to the base 96. The overall length NL3 may be, e.g., 8.205 in., as shown in FIG. 7C. FIG. 7D shows a perspective view of the neck latch cam 46.

Seat Assembly

Figure 8B:
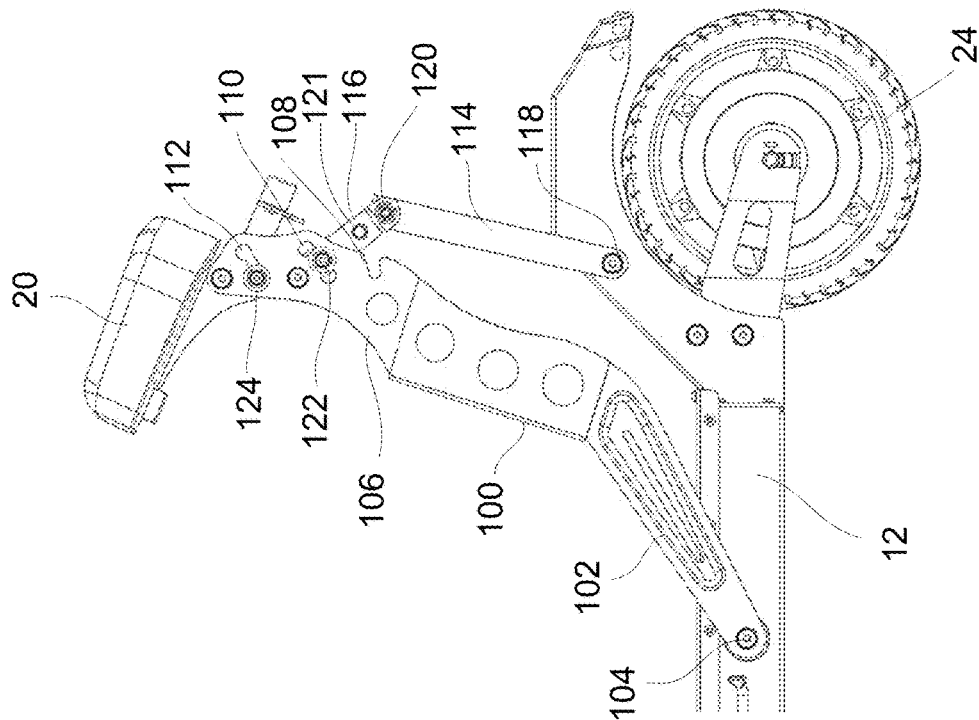
Figure 8A:
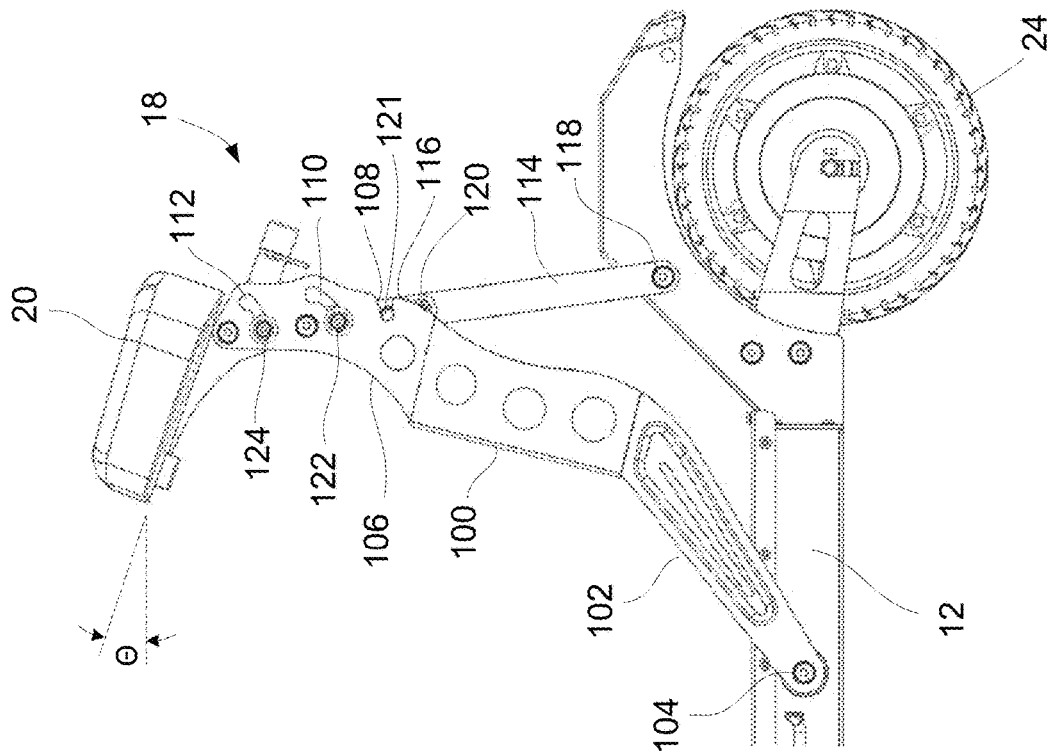

Turning now to the seat assembly, FIGS. 8A to 8D show detail side views of one variation of the how the seat assembly 18 may be retracted into the compact configuration and/or deployed for use. As shown in FIG. 8A, the seat 20 is shown when fully deployed for use in which the seat 20 may be positioned to form an angle θ, e.g., 20°, relative to the deck 12 such that the front portion of the seat 20 extends upward relative to the user when seated upon the seat 20. The seat 20 may be angled as such relative to the deck 12 to prevent the user from sliding off of the seat 20 when stopping the scooter. The angle θ may be adjusted to fall within a range suitable for rider comfort. The seat 20 may be pivotably coupled to a seat pivot assembly which is generally comprised of a seat pivot arm 100 having a first lever arm 102 extending at an angle from the seat pivot arm 100 which may be pivotably coupled to the deck 12 via pivot 104 and a second lever arm 106 extending from the seat pivot arm 100 to rotatably couple to the seat 20. A first end of the lower arm member 114 may be pivotably coupled via pivot 118 to the chassis while a second end of the lower arm member 114 may be pivotably coupled to a first end of an upper arm member 116 via a pivot 120 and a second end of the upper arm member 116 may be coupled to the second lever arm 106 via a pivoted connection as well.

When the lower and upper arm members 114, 116 are fully extended relative to one another, as shown in FIG. 8A, a locking pin 121 extending from the upper arm member 116 may engage with a receiving channel 108 defined along the second lever arm 106 such that further rotation of the arm members 114, 116 is inhibited. A position of the extended arm members 114, 116 may be maintained and locked into place via a retractable stop 122 which is slidingly positioned within a curved receiving channel 110 defined along second lever arm 106.

When the seat pivot assembly is ready to be retracted into its compact configuration, the retractable stop 122 may be disengaged from its locked position within the curved receiving channel 110 to allow the lower arm members 114 to be pulled away from the second lever arm 106 to disengage the locking pin 121 from the receiving channel 108. As the lower and upper arm members 114, 116 rotate about their pivoted connections, as shown in FIG. 8B, the seat pivot arm 100 may rotate about pivot 104 to begin the retraction of the seat pivot assembly. As shown in FIG. 8C, when the pivot 120 has been fully retracted, the seat pivot arm 100 may be retracted against the chassis and first lever arm 102 may lie parallel with deck 12. The seat 20 may then be retracted as well by disengaging retractable stop 124 to allow the seat pivot bracket 130, upon which the seat 20 may be mounted, and seat extension members 132 to reposition within receiving channel 112 so that the seat 20 is collapsed into a low profile as well, as shown in FIG. 8D.

With the seat 20 retracted over the rear wheel 24, the deck 12 remains completely free and unencumbered by any of the seat mechanisms allowing for unhindered placement of the user's feet. In other variations, the seat assembly may be removed entirely. In yet another variation, the lower and upper arm members 114, 116 may be eliminated entirely such that the second lever arms 106 may fully support the seat 20 alone. The seat pivot arm 100 may accordingly be strengthened or formed of a high strength material, e.g., carbon fiber, or formed as an integral part of the frame via, e.g., casting, molding, extrusion, etc.

Figure 8E:
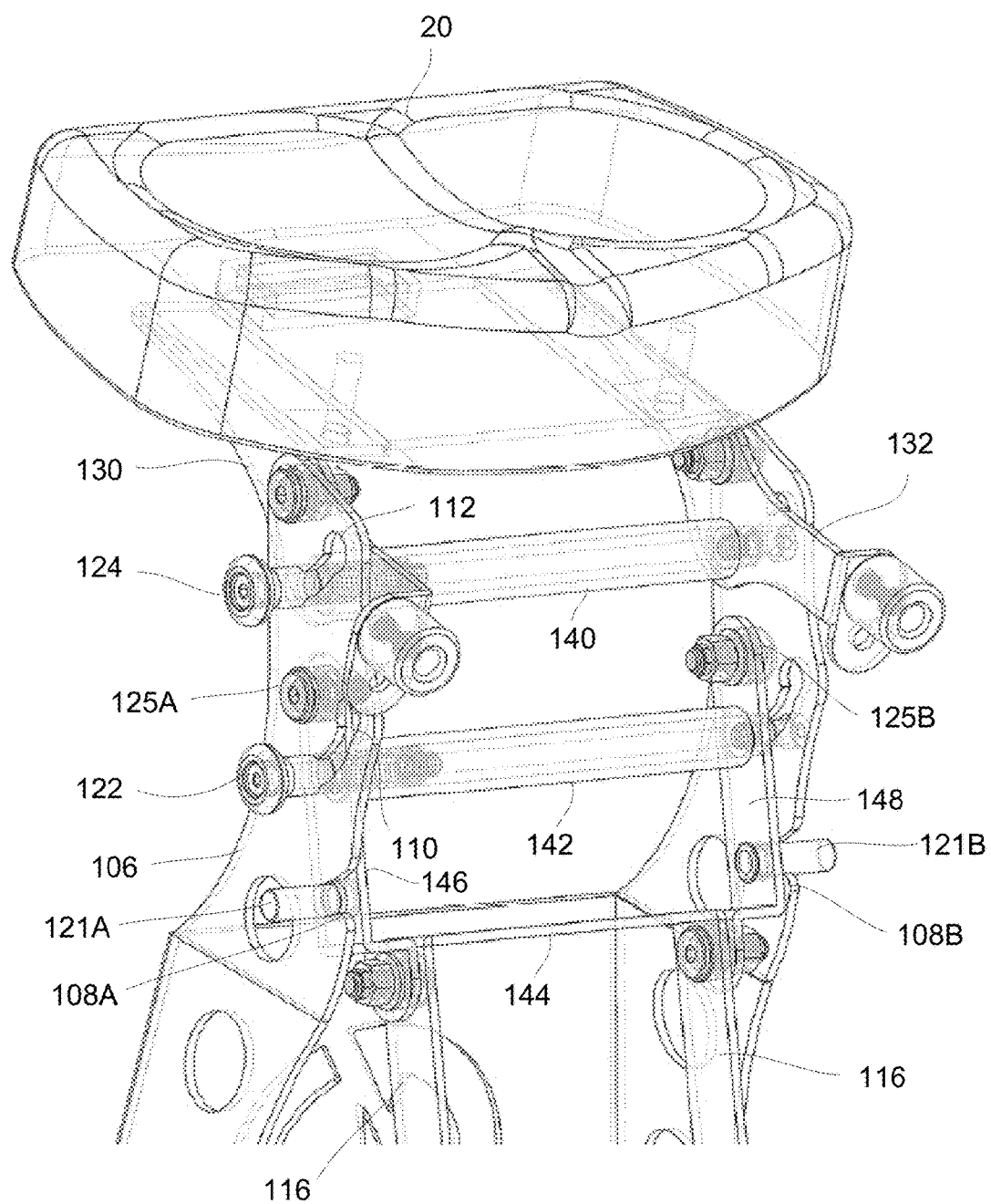
FIG. 8E shows a detail perspective view of the locking mechanism for the seat pivot bracket.
Figure 11C:
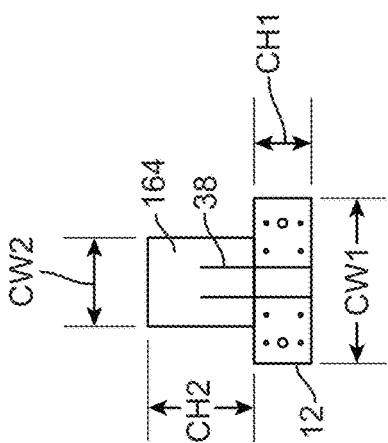
FIGS. 11A to 11D show various views of one variation of the body chassis.
Figure 11D:
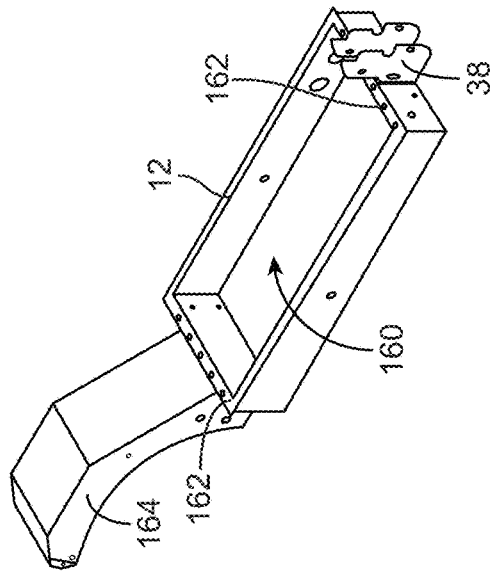
Figure 11A:
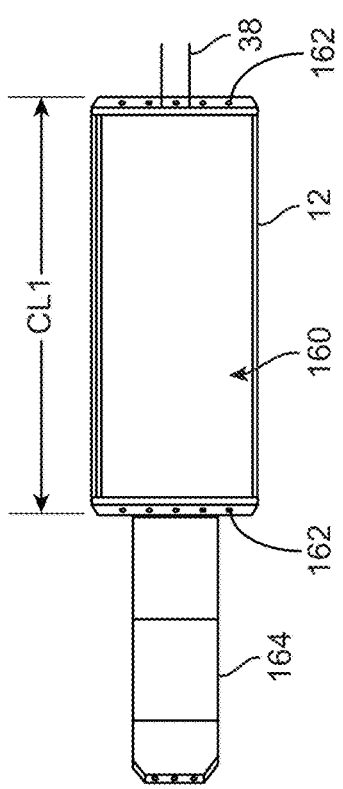
Figure 11B:
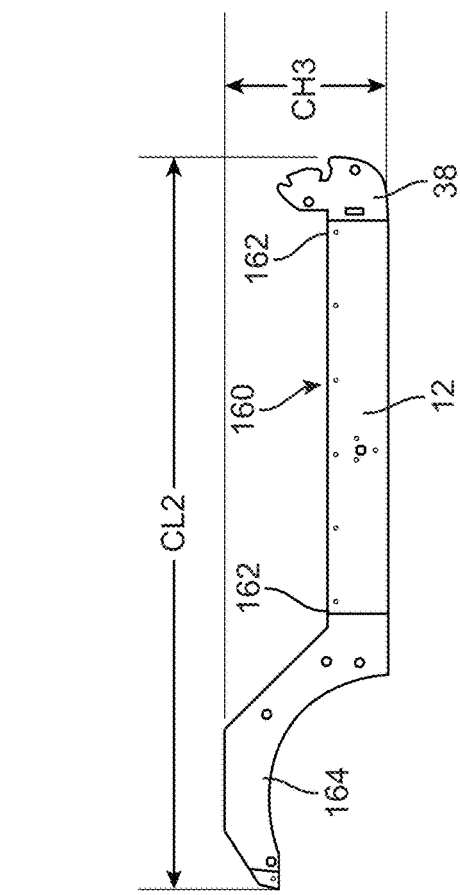

FIG. 8E shows a detail perspective view of the seat assembly to illustrate the various locking mechanisms in one variation. With the seat pivot bracket 130 and seat 20 deployed and the upper arm members 116 extended, the ends of the upper members 116 may be seen rotatingly coupled to a crossbar 144 which extends into a yoke member having two parallel extension arms 146, 148 which is also rotatingly coupled to the second lever arm 106 at respective pivots 125A, 125B. The locking pins 121A, 121B may also be seen extending transversely from respective extension arms 146, 148 in opposite directions for engagement with corresponding receiving channels 108A, 108B. The retractable stop 122 may extend from a tubular member 142 which extends between the extension arms 146, 148 such that when the stop 122 is pulled into the tubular member 142, the stop 122 may be situated within an enlarged portion of the curved receiving channel 110 such that movement between the crossbar 144 and second lever arm 106 is prevented and effectively locks the movement of the seat assembly. The stop 122 may be pulled away from the tubular member 142 and receiving channel 110 thereby allowing movement between the two for retracting or adjusting the seat assembly.

The seat 20 is also adjustable relative to the second lever arm 106 as the seat 20 may be attached to a seat pivot bracket 130 which extends to two arm members 312 which have a tubular member 140 also extending therebetween. The retractable stop 124 may be retractably coupled to the tubular member 140 and may also extend through receiving channel 112 to enable the pivoting and locking of the seat bracket 130. As with the second lever arm 106, when the stop 124 is situated within an enlarged portion of the receiving channel 112, movement between the seat bracket 130 and second lever arm 106 is prevented and effectively locks the movement of the seat bracket 130. Retracting the stop 124 away from the tubular member 140 allows for movement between the seat bracket 130 and second lever arm 106.

FIGS. 9A to 9D show various views of the seat pivot arm 100 having a length PL1, e.g., 6.851 in., with the first lever arms 102A, 102B extending in parallel from the seat pivot arm 100 at a length PL3, e.g., 7.712 in., while separated from one another at a width PW2, e.g., 8.435 in. Each of the first lever arms 102A, 102B may have a first thickness PT1, e.g., 0.188 in., and a second thickness PT2, e.g., 0.125 in. The seat pivot arm 100 may taper in width from the first lever arms 102A, 102B down to a smaller width such that the second lever arms 106A, 106B may have a length PL2, e.g., 6.434 in., and the taper of the seat pivot arm 100 relative to the first lever arms 106A, 106B may form an angle PA1, e.g., 188.305°. The entire length of the seat assembly may form a length PL4, e.g., 21.316 in., as shown.

The side view the assembly shown in FIG. 9B illustrates that the seat pivot arms 100 may define multiple holes PD1, e.g., 1.375 in., PD2, e.g., 1.313 in., PD3, e.g., 1.250 in., PD4, e.g., 1.063 in. The receiving channel 108 of the second lever arms 106A, 106B may define a radius PR1, e.g., 0.203 in., while the rear portion of the arms 106A, 106B may be defined to have a curved profile with radii PR2, e.g., 0.254 in., and PR3, e.g., 0.254 in. The multiple openings for receiving the various pivots may be formed to have a diameter PD5, PD6, and PD7 all having a common diameter, e.g., 0.470 in. The end view shown in FIG. 9C illustrates the varying heights where a height PH1, e.g., 3.742 in., of the seat pivot arm 100 and a height PH2, e.g., 5.217 in., of the first lever arms 102A, 102B relative to the seat pivot arm 100 and an overall height PH3, e.g., 9.063 in. FIG. 9D illustrates a perspective view of the overall seat arm assembly.

The seat pivot bracket 130 is shown in the various views of FIGS. 10A to 10C which illustrate the various features. As shown in the top view of the seat pivot bracket 130 in FIG. 10A, the seat pivot bracket 130 may have a base 150 having two seat extension members 132 extend proximally from the base 150. The bracket 130 may have a first width BW1, e.g., 6.230 in., and a second width BW2, e.g., 8.105 in., formed by the seat extension members 132 having a length BL4, e.g., 2.832 in., which form tabbed ends having a width BW4, e.g., 0.938 in., and height BH1, e.g., 1.621 in., as shown. The tabbed ends may also define several openings each having a diameter BD1, e.g., 0.313 in., for attaching one or more stops or bumpers.

The base 150 may have a first length BL1, e.g., 4.238 in., and a second length BL5, e.g., 0.138 in., and the bracket 130 may have an overall length of BL2, e.g., 7.070 in., and overall width BW2, e.g., 8.105 in. The base 150 may also define one or more openings having a radius BR1, e.g., 0.172 in., for mounting the seat 20. An additional tab or extension member may be formed on a proximal end of the base 130 having a width BW3, e.g., 1.960 in., and a length BL3, e.g., 0.909 in. This tab or extension member may be formed at an angle BA2, e.g., 10.5°, relative to the base 150, as shown in the side view of FIG. 10C. The base 150 may also be formed to have a slight angle BA1, e.g., 4°, along the edges of the base 150, as shown in the end view of FIG. 10B. Additionally, one or more openings may be defined along the brackets 130 having various radii BR2, e.g., 0.164 in., BR5, e.g., 0.258 in., BR3, e.g., 0.235 in., and BR4, e.g., 0.235 in., as shown in FIG. 10D.

Turning now to FIGS. 11A to 11D, various views of the deck 12 are illustrated. As shown in the top view of FIG. 11A, the deck 12 forms a chassis defining an enclosure 160 which may hold a number of components for the scooter 12, e.g., battery, electronics, etc. The enclosure 160 may have a length CL1, e.g., 19.382 in., a height CH1, e.g., 2.752 in., and a width CW1, e.g., 7.750 in., and may define a lip or edge 162 around a periphery of the enclosure 160 for attaching a platform upon which the user may stand or place their feet.

A distal portion of the enclosure 160 may have the neck latch receiving member 38 mounted and a proximal portion of the enclosure 160 may have a fender 164 attached which extends proximally from the enclosure 160 to cover the rear wheel 24 such that the fender 164 extends above the enclosure 160 at a height CH2, e.g., 4.942 in. and a width CW2, e.g., 4.069 in. With the fender 164 attached, the deck 12 may have an overall length CL2, e.g., 34.362 in., and an overall height CH3, e.g., 7.694 in.

The applications of the devices and methods discussed above are not limited to scooters but may be applied to other vehicles or applications. Modification of the above-described assemblies and methods for carrying out the invention, combinations between different variations as practicable, and variations of aspects of the invention that are obvious to those of skill in the art are intended to be within the scope of the claims.

What is claimed is:

1. A reconfigurable seat assembly, comprising:
a deck sized to accommodate a user when standing upon the deck;
a seat sized to accommodate the user when sitting upon the seat, wherein the seat is configured to be angled relative to the deck;
a lever arm pivotably coupled to the deck and pivotably coupled to the seat; and
one or more arm members pivotably coupled to a portion of the lever arm via a yoke member,
wherein the seat is configurable between a deployed configuration where the seat is positioned above the deck and a compact configuration where the seat is retracted above a chassis in proximity to the deck, and
wherein the lever arm comprises a first lever arm pivotably coupled to the chassis, a seat pivot arm extending from the first lever arm, and a second lever arm extending from the seat pivot arm and pivotably coupled to the seat.

2. The assembly of claim 1 wherein the one or more arm members comprise:
a lower arm member pivotably coupled to the chassis in proximity to the deck; and
an upper arm member pivotably coupled to the lower arm member and to a portion of the second lever arm.

3. The assembly of claim 1 further comprising one or more stop members which are configured to lock a position of the one or more arm members relative to the lever arm.

4. The assembly of claim 1 wherein the seat is configured to be angled relative to the deck such that a distal portion is angled away from the deck.

5. The assembly of claim 1 further comprising a reconfigurable neck assembly attached to a distal portion of the deck.

6. The assembly of claim 5 further comprising a steering column attached to the neck assembly.

7. The assembly of claim 6 wherein the neck assembly and pivoting seat assembly are reconfigurable between a deployed position and a retracted position.

8. The assembly of claim 7 wherein the neck assembly is configured to prevent or inhibit a release of the neck assembly from the deployed position when the user sits or stands upon the deck.

9. The assembly of claim 8 wherein the neck assembly further comprises:
a neck latch cam having an elongate member and an angled member configured to rotate relative to a first pivot;
a pivot throat latch positioned in proximity to the angled member and configured to rotate relative to a second pivot when actuated via the angled member;
a neck latch configured to rotate relative to a third pivot; and
a neck latch receiving member configured to lock a position of the neck latch when rotated about the third pivot upon actuation of the neck latch cam when rotated about the first pivot and the pivot throat latch when rotated about the second pivot.

10. The assembly of claim 1 wherein the chassis comprises a scooter chassis.

* * * * *